United States Patent [19]

Vezza

[11] Patent Number: 5,976,240
[45] Date of Patent: *Nov. 2, 1999

[54] REFRACTORY SYSTEM INCLUDING REACTIVE METAKAOLIN ADDITIVE

[75] Inventor: Thomas F. Vezza, State College, Pa.

[73] Assignee: North American Refractories Co., Cleveland, Ohio

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/925,206

[22] Filed: Sep. 8, 1997

[51] Int. Cl.⁶ ............................................. C04B 7/32
[52] U.S. Cl. ................. 106/694; 106/695; 106/705; 106/706; 106/811; 106/812; 106/DIG. 1; 501/144
[58] Field of Search .................... 106/696, 692, 106/694, 695, 705, 706, 708, 811, 812, DIG. 1, 416, 486; 501/144

[56] References Cited

U.S. PATENT DOCUMENTS

| | | | |
|---|---|---|---|
| 4,310,486 | 1/1982 | Cornwell et al. | 264/309 |
| 4,640,715 | 2/1987 | Heitzmann et al. | 106/706 |
| 4,642,137 | 2/1987 | Heitzmann et al. | |
| 4,842,649 | 6/1989 | Heitzmann et al. | 106/706 |
| 4,915,740 | 4/1990 | Sakai et al. | 106/104 |
| 4,975,396 | 12/1990 | Thiery | 501/90 |
| 5,084,101 | 1/1992 | Engels et al. | 106/624 |
| 5,167,710 | 12/1992 | Leroux et al. | 106/711 |
| 5,269,845 | 12/1993 | Grunau et al. | 106/692 |
| 5,372,640 | 12/1994 | Schwarz et al. | 106/705 |
| 5,484,480 | 1/1996 | Styron | 106/706 |
| 5,488,991 | 2/1996 | Cowan et al. | 166/293 |
| 5,494,267 | 2/1996 | Anderson et al. | 266/281 |
| 5,624,489 | 4/1997 | Fu et al. | 106/692 |
| 5,792,251 | 8/1998 | Smiley et al. | 106/484 |

OTHER PUBLICATIONS

"Bond Slip Characteristics of Steel Fibers in High Reactivity Metakaolin (HRM) Modified Cement Based Matrixes" Banthia et al. Cement Conc. Research 26(5) p 657–62, (1996) (abstract only).

*Primary Examiner*—Paul Marcantoni
*Attorney, Agent, or Firm*—Mark Kusner

[57] ABSTRACT

An additive for reducing the calcium aluminate cement content in a refractory mix containing calcium aluminate cement. The additive is comprised of about 80% by weight amorphous, powdered metakaolin, the metakaolin having a mean particle size of less than about 3.0 microns, and about 20% by weight microsilica, the microsilica having a mean particle size of less than 45 microns.

33 Claims, No Drawings

REFRACTORY SYSTEM INCLUDING REACTIVE METAKAOLIN ADDITIVE

FIELD OF THE INVENTION

The present invention relates generally to refractory castables, and more particularly to a refractory castable system containing a reactive metakaolin additive for modifying the properties of the system and for reducing the calcium aluminate content thereof.

BACKGROUND OF THE INVENTION

Modem refractory castables are designed to have operating properties to meet a wide range of environmental and temperature conditions. In addition to operating properties, controlled properties such as setting times, hardening kinetics and rheology, are also important. In this respect, most modem refractory castables use admixtures in order to modify or control such properties. Admixtures basically interact with the hydraulic binder system, i.e., the calcium aluminate cement, during hydration, thereby influencing properties such as the workability, setting time and early strength of the refractory castable. As with all hydraulic binders, the chemical and mineral composition of the calcium aluminate cement generally determine the rheology, reactivity and refractoriness of the system. This does not mean, however, that the setting time and flow behavior of a refractory material depend, for a given water cement ratio, only on the cement used. The constituents other than the cement, such as for example, admixtures greatly influence the setting time and flow behavior of a refractory system.

For refractory compositions, the major admixtures used are commonly referred to as "accelerators," "retarders" and "plasticizers" (water-reducing agents). Accelerators generally accelerate or quicken the setting time of a refractory, whereas retarders generally slow down the setting time of the refractory material. Plasticizers are used to reduce the amount of water used in the refractory, and greatly affect the flow characteristics of the refractory material. A combination of retarders and accelerators is possible, and in most instances, recommended. In this respect, the two effects do not necessarily cancel each other out, but can affect the refractory material at different stages of hydration to produce a working time sufficient to allow forming of the material followed by a quick setting of the same. Admixtures interact not only with the calcium aluminate cement, but also with fine reactive materials and even with the aggregate present in the refractory system. Thus, working time, setting time and hardening can be controlled by a retarder/accelerator mixture to provide a more user-friendly control of the hydration kinetics.

Fine reactive fillers such as reactive alumina or silica fume, that are not conventionally considered as "admixtures," also affect the rheology, setting time, and even the physical properties of the refractory system. In this respect, some reactive fillers show effects that are very similar to the effects of classical admixtures as a result of their interaction with cement and the admixtures.

The present invention provides a refractory system including a reactive metakaolin-based additive or filler which may be used in place of a portion of calcium aluminate cement, which metakaolin-based filler enhances the cast properties of the refractory system, as well as properties relating to the rheology, setting times and hardening kinetics of the refractory system.

SUMMARY OF THE INVENTION

In accordance with the present invention, there is provided an additive for reducing the calcium aluminate cement content in a refractory castable containing calcium aluminate cement. The additive is comprised of amorphous metakaolin powder having a mean particle size of less than about 3.0 microns, and about 20% by weight microsilica having a mean particle size of less than 45 microns.

In accordance with another aspect of the present invention, there is provided an additive for reducing the calcium aluminate cement content in a refractory castable containing calcium aluminate cement. The additive is comprised of amorphous metakaolin powder having a mean particle size of about 3.0 microns, an inorganic fine filler material having a particle size of less than 45 microns, a water soluble, organic dispersant, and a set-modifying admixture.

In accordance with another aspect of the present invention, there is provided an additive for use in a refractory castable comprised of about 75% to about 83% by weight of a amorphous metakaolin powder having a particle size of less than about 45 microns, and about 17% to about 25% by weight or an inorganic, fine filler material having a particle size of less than about 45 microns.

In accordance with another aspect of the present invention, there is provided a cement mixture for refractory castables comprised of about 50% to 75% by weight of calcium aluminate cement, about 20% to 40% by weight amorphous metakaolin, and about 5% to 10% by weight microsilica.

In accordance with another aspect of the present invention, there is provided a cement mixture for a refractory castable comprised of calcium aluminate cement and a metakaolin-based additive in an amount equal to about 40% to about 60% by weight of said calcium aluminate cement. The metakaolin-based additive is comprised of about 70% to about 85% by weight of an amorphous metakaolin powder and about 17% to about 25% by weight of a fine filler material selected from the group consisting of a microsilica, reactive alumina and fly ash.

In accordance with another aspect of the present invention, there is provided a cement mixture for use with a refractory castable comprised of a pure calcium aluminate cement having an alumina content of about 45% to about 80% by weight, and an additive comprised of about 70% to about 85% by weight of a amorphous metakaolin powder, wherein about 99% of the metakaolin power has a particle size of about 45 microns or less, and about 15% to about 30% by weight of microsilica, wherein about 99% by weight of the microsilica has a particle size of about 45 microns or less. The additive is present in an amount equal to about 40% to about 60% by weight of said calcium aluminate cement.

In accordance with another aspect of the present invention, there is provided a refractory castable mix comprised of refractory aggregate and particulate, about 10% to about 30% by weight high alumina content, calcium aluminate cement, a reactive additive comprised of about 4 parts by weight of amorphous metakaolin and about 1 part by weight microsilica, the additive being present in an amount equal to about 50% by weight of the calcium aluminate cement, a dispersant, and a binary, set-modifying admixture.

In accordance with another aspect of the present invention, there is provided a refractory castable mix comprised of about 60% to about 80% by weight refractory aggregate and particulate, about 10% to about 30% by weight calcium aluminate cement, about 4% to about 18% by weight amorphous metakaolin powder, wherein about 99% of the metakaolin powder has a particle size of less than about 45 microns, and about 1% to about 5% by weight fine filler material selected from the group consisting of microsilica, reactive alumina and fly ash, wherein about 99% of the filler material has a particle size of less than about 45 microns.

It is an object of the present invention to provide a reactive additive for a refractory system containing calcium aluminate cement.

Another object of the present invention is to provide an additive as described above that modifies the rheology, working time, set time, green strength and other properties of the refractory system.

Another object of the present invention is to provide an additive as described above which enhances the after-heat-treatment physical properties of the refractory system.

Another object of the present invention is to provide an additive as described above to replace a portion of the calcium aluminate cement found in the refractory system.

A still further object of the present invention is to provide an additive as described above that is comprised primarily of highly reactive, amorphous metakaolin.

A still further object of the present invention is to provide an additive as described above that can be added in place of calcium aluminate cement to reduce the cement content and water content of the refractory system.

A further object of the present invention is to provide a cement mixture for refractory castables formed in part from a highly reactive, amorphous metakaolin material.

A still further object of the present invention is to provide a refractory system including refractory aggregate, calcium aluminate cement and an additive comprised primarily of amorphous metakaolin.

These and other objects and advantages will become apparent from the following description of preferred embodiments.

DETAILED DESCRIPTION OF PREFERRED EMBODIMENTS

The present invention relates to a reactive mixture that finds advantageous application with refractory castables containing calcium aluminate cement. The present invention contemplates use of the reactive mixture as 1) an additive to be added to a refractory castable to replace a portion of the calcium aluminate cement therein, 2) as a constituent in a calcium aluminate cement mixture, and 3) as a constituent in a refractory castable system. According to the present invention, a mixture of highly reactive metakaolin and microsilica may be used as a refractory "filler," as a constituent of a calcium aluminate cement, or as a constituent in a refractory castable containing calcium aluminate cement.

The present invention relates specifically to the use of an amorphous metakaolin, as disclosed in Assignee's application Ser. No. 08/800,620 filed Feb. 14, 1997, now U.S. Pat. No. 5,792,251 to Smiley et al., the disclosure of which is expressly incorporated herein by reference. U.S. Pat. No. 5,792,251 discloses a specific, amorphous metakaolin material manufactured by controlling the processing of kaolin clay. The process described in the aforementioned application produces a highly reactive metakaolin having amorphous regions with very high internal porosity and surface area. The amorphous regions of the metakaolin provide greater surface area, which surface area is available for reaction with the deleterious alkaline products of hydration and hydrolysis of cement.

The metakaolin formed through the process described in U.S. Pat. No. 5,792,251 has amorphous regions that are identifiable by conventional X-ray diffraction techniques. The amorphous regions of the metakaolin produce an identifiable X-ray pattern showing amorphous humps centered at 2θ equals approximately 22°, 37° and 46°. The major kaolinite peaks are absent at 2θ equals 12° and 24.5°, indicating a major loss of hydroxyl. The X-ray pattern shows spikes at 21° and 26.5° that represent crystalline silicon dioxide ($SiO_2$). The spike at 2θ equals 25° indicates the presence of anatase. As is well known, the broad humps are a result of the lack of long-range order of amorphous materials. The resulting metakaolin structure can also be identified by infrared absorption techniques showing absorption bands at 3695 $cm^{-1}$, 3620 $cm^{-1}$ and 3650 $cm^{-1}$.

The calcining process disclosed in the prior application is conducted to destroy the microcrystalline structure of the kaolin by a decomposition process (i.e., the removal of the hydroxyl and hydrogen ions from the kaolin structure) to form an amorphous structure having very high internal porosity and surface area. As disclosed in application Ser. No. 08/800,620 filed Feb. 14, 1997, the calcining process is controlled by maintaining the ignition loss at a predetermined level.

The amorphous metakaolin produced by the aforementioned calcining process has an estimated bulk density that ranges from about 1.5 $g/cm^3$ to 1.75 $g/cm^3$, and has an estimated porosity of about 30% to 45%. A test is run on unsized metakaolin formed according to the calcining process disclosed in the aforementioned U.S. Pat. No. 5,792,251. The test is conducted on particles ranging from 0.5 to 2.5 mm. The bulk density of these unsized metakaolin particles is about 1.63 $g/cm^3$ and the porosity is about 38%.

In accordance with the present invention, the amorphous metakaolin (produced in accordance with the process disclosed in U.S. Pat. No. 5,792,251) is pulverized into a powdered form, wherein the powder has a predetermined statistical distribution of particle sizes. Specifically, the particle sizes are based upon the interstitial spacing of the components of the calcium aluminate cement with which it is to be used. In other words, the range of particle sizes of the powdered metakaolin is preferably dimensioned to fit among and between the calcium aluminate cement particulate. Preferably, the metakaolin is pulverized into a particle size finer than that of the components of the cement. In this respect, it is important to have a powdered metakaolin finer than that of the cement's component to insure that the tricalcium silicate ($Ca_3SiO_5$) particulate within the cement that generates the deleterious calcium hydroxide as the cement sets, will have a surrounding environment of the reactive metakaolin particles.

In accordance with the present invention, the metakaolin preferably has a particle size ranging from about 5 to 15 microns. It is also important that the particle size of the metakaolin not be too fine. In this respect, the finer the metakaolin, the greater the amount of water needed to produce a flowable mixture when the metakaolin is added to the cement. In this respect, the higher water-to-cement ratio can adversely affect the properties of the refractory composition. Thus, in the context of the present invention, the particle size of the metakaolin is important. In accordance with the present invention, the metakaolin powder preferably has a particle size distribution as follows: +325 Mesh (45 microns) Residue, less than 1% by weight; approximately 90% of the powdered metakaolin having particle size of approximately 15 microns or less; approximately 50% of the powdered metakaolin having a particle size of approximately 5 microns or less; and approximately 10% of the powdered metakaolin having a particle size of 2 microns or less.

In accordance with a preferred embodiment of the present invention, the metakaolin powder has a composition as follows:

| Metakaolin Chemical Composition | Wt % |
| --- | --- |
| $SiO_2 + Al_2O_3 + Fe_2O_3$ | >97.0 |
| Sulphur Trioxide ($SO_3$) | <0.50 |
| Alkalies (as $Na_2O$, $K_2O$) | <0.50 |
| Loss on Ignition | <1.00 |
| Moisture Content | <1.00 |

The physical properties of a metakaolin in accordance with a preferred embodiment of the present invention are as follows:

| Metakaolin Physical Properties | |
| --- | --- |
| Specific Gravity | 2.50 g/cm$^3$ |
| Color | White |
| Physical form | Powder |
| +325 Mesh (45 μm) Residue | <1.0% |
| Average Particle Size | <2.5 μm |

The addition of the amorphous metakaolin to a refractory castable system containing pure calcium aluminate cement (i.e., calcium aluminate cement with no dispersant additives and no set-modifying admixtures added thereto) produces a very rapid set in the refractory castable making it unsuitable for actual use. Basically, the refractory castable with the added metakaolin sets without sufficient working time to enable handling and forming of the refractory. To allow sufficient working time, suitable flow characteristics and an acceptable set time, a dispersant system and a binary set-modifying admixture system are preferably used in conjunction with the amorphous metakaolin.

In accordance with the present invention, the dispersant system is preferably comprised of dispersants in the form of an inorganic fine filler material, and an organic dispersant. The inorganic fine filler material preferably has a reactive particle size of less than 45 microns. Materials such as fly ash, reactive alumina and microsilica may be used. In accordance with a preferred embodiment of the present invention, microsilica is preferably used. In addition to being a filler material, it is believed that the microsilica helps to disperse the amorphous metakaolin during the wet mixing phase to promote more uniform distribution of the metakaolin and improve rheology. Preferably, the amount of fine filler material added with the metakaolin is the minimum amount sufficient to produce a uniform distribution of the metakaolin within the refractory system during wet mixing. In accordance with the present invention, the ratio of metakaolin to microsilica may vary between about 3 parts by weight metakaolin to about 1 part by weight microsilica and about 5 parts by weight metakaolin to about 1 part by weight microsilica. In accordance with a preferred embodiment of the present invention, the microsilica is added to the metakaolin at a ratio of about 4 parts by weight metakaolin to about 1 part by weight microsilica. The microsilica preferably has a particle size of less than 45 microns. In the preferred embodiment of the present invention, the microsilica has the following physical properties:

| Microsilica Physical Properties | |
| --- | --- |
| Specific Gravity | 2.20 g/cm$^3$ |
| Physical form | Powder |
| +325 Mesh (45 μm) Residue | <1.0% |
| Particle Size | <45 μm |
| Bulk Density (loose-filled) | 1.25 g/cm$^3$ |

The microsilica has the following chemical composition:

| Microsilica Chemical Composition | Wt % |
| --- | --- |
| $SiO_2 + Al_2O_3 + Fe_2O_3$ | >95.0 |
| Sulphur Trioxide ($SO_3$) | <0.10 |
| Alkalies (as $Na_2O$, $K_2O$) | <1.00 |
| Loss on Ignition | <2.50 |
| Moisture Content | <1.50 |
| pH | 5.5–7.5 |

The organic dispersant is preferably in the form of a water-soluble polymeric material. In the Examples to be discussed infra, a low molecular weight (93,500) polyacrylate polymer dispersing agent, sold under the registered trademark DARVAN® 811D by R. T. Vanderbilt Company Inc., (address), is used as the organic dispersant. DARVAN® 811D dispersing agent is a dry, granular material having a bulk density of 35 to 40 lbs/ft$^3$ (0.56 to 0.64 g/cm$^3$). A 5% solution of DARVAN® 811D has about 7.9 to 9.5 pH. It will of course be appreciated that other organic dispersants may be used and find advantageous application as part of a metakaolin package or refractory system within the scope of the present invention.

Referring now to the binary set-modifying admixture, such admixture is provided to modify the properties of the refractory castable system, and specifically, to modify the working time, setting time and hardening kinetics of the refractory castable system. In accordance with the present invention, the binary set-modifying admixture system includes a set retarder to slow down the setting time of the refractory castable to provide sufficient working time for the material. The set retarder is preferably selected from the group consisting of boric acid, citric acid and tartaric acid. In accordance with a preferred embodiment of the present invention, boric acid is used as the set retarder. In accordance with the present invention, a set accelerator such as lithium carbonate is utilized to provide a quick setting of the refractory after a sufficient working time. In accordance with the present invention, the set retarder and accelerator are added at amounts sufficient to provide at least one-hour working time with stable flow and a set time of about 2–6 hours thereafter.

As indicated above, the metakaolin/microsilica additive may be used as a replacement for a portion of calcium aluminate cement in a refractory castable system, or may be mixed as a component in a calcium aluminate cement, or may be mixed as a component in a refractory system including calcium aluminate cement.

The invention shall be further described together with the following examples showing a metakaolin/silica additive added to refractory castables. The examples contrast the properties of a refractory castable utilizing a metakaolin/microsilica mixture against a like refractory material without the metakaolin/microsilica mixture. The following samples and test results are set forth for illustration only, and proportions are set forth in weight % unless otherwise indicated. In the following examples, particle sizes are set forth in Tyler Mesh sizes, wherein, by way of example, the legend "3.5/100M" means a particle sized less than 3.5 Tyler Mesh, but greater than 100 Tyler Mesh, and the legend "–100M" means a particle of less than 100 Tyler Mesh.

EXAMPLE 1

Metakaolin Used In a Conventional 70% $Al_2O_3$ Castable

| | Mix Identification | |
| --- | --- | --- |
| | A | B |
| | Conventional | Comparative |
| | Castable | Conventional |
| Description | w/Metakaolin | Castable |
| Service Limit, °F. | 3200 | 3200 |
| Mix Formulation | | |
| Sintered Mullite (3/20M) | 25 | 25 |
| Calcined Bauxite (3.5/65M) | 35 | 35 |
| Calcined Bauxite (–200M) | 10 | 10 |
| Kyanite Fines (–100M) | 15 | 15 |
| 80% $Al_2O_3$ CA-Cement | 10 | 15 |
| Metakaolin | 4 | |
| Fume Silica | 1 | |
| Plasticizer | 0.2 | |
| Chemical Composition, wt. % | | |
| $Al_2O_3$ | 72.1 | 74.3 |
| $SiO_2$ | 21.6 | 18.5 |
| $Fe_2O_3$ | 1.2 | 1.2 |
| $TiO_2$ | 2.3 | 2.2 |
| MgO | 0.2 | 0.3 |
| CaO | 2.0 | 2.8 |
| $Na_2O/K_2O$ | 0.4 | 0.5 |
| Casting Properties | | |
| Wet Mixing Time, mins. | 6 | 5 |
| Water to Cast, % | 8.9 | 10.5 |
| Flow ASTM 860, % | 65 | 60 |
| Working Time, hrs. | 1.5 | 1.0 |
| Initial Set Time, hrs. | 8.0 | 5.0 |
| Physical Properties | | |
| After Drying at 230° F. | | |
| Modulus of Rupture, $lb/in^2$ | 700 | 700 |
| After Firing to 1500° F. | | |
| Bulk Density, $lb/ft^3$ | 155 | 153 |
| Apparent Porosity, % | 24.7 | 25.0 |
| Linear Change, % | –0.1 | –0.1 |
| Modulus of Rupture, $lb/in^2$ | 500 | 400 |
| Cold Crushing Strength, $lb/in^2$ | 3000 | 2400 |
| After Firing to 2700° F. | | |
| Bulk Density, $lb/ft^3$ | 150 | 149 |
| Apparent Porosity, % | 22.4 | 24.0 |
| Linear Change, % | 1.1 | 1.3 |
| Modulus of Rupture, $lb/in^2$ | 1200 | 2000 |
| After Firing to 2910° F. | | |
| Bulk Density, $lb/ft^3$ | 152 | 148 |
| Apparent Porosity, % | 22.4 | 20.0 |
| Linear Change, % | 2.0 | 1.9 |
| Modulus of Rupture, $lb/in^2$ | 1500 | 2700 |
| Hot Modulus of Rupture, $lb/in^2$ | | |
| @ 2000° F. | 900 | 600 |
| @ 2500° F. | 300 | 200 |

EXAMPLE 2

Metakaolin Used In a Conventional 60% $Al_2O_3$ Castable

| | Mix Identification | |
| --- | --- | --- |
| | C | D |
| | Conventional | Comparative |
| | Castable | Conventional |
| Description | w/Metakaolin | Castable |
| Service Limit, °F. | 3100 | 3100 |
| Mix Formulation | | |
| Fireclay Aggregate (3.5/65M) | 45 | 45 |
| Calcined Bauxite (8/65M) | 15 | 15 |
| Calcined Bauxite (–200M) | 10 | 10 |
| Kyanite Fines (–100M) | 15 | 15 |
| 80% $Al_2O_3$ CA-Cement | 10 | 15 |
| Metakaolin | 4 | |
| Fume Silica | 1 | |
| Plasticizer | 0.2 | |
| Chemical Composition, wt. % | | |
| $Al_2O_3$ | 59.6 | 61.9 |
| $SiO_2$ | 34.5 | 31.4 |
| $Fe_2O_3$ | 0.8 | 0.8 |
| $TiO_2$ | 2.2 | 2.1 |
| MgO | 0.2 | 0.2 |
| CaO | 2.0 | 2.9 |
| $Na_2O/K_2O$ | 0.5 | 0.5 |
| Casting Properties | | |
| Wet Mixing Time, mins. | 6 | 5 |
| Water to Cast, % | 8.5 | 9.5 |
| Flow ASTM 860, % | 67 | 60 |
| Working Time, hrs. | 1.5 | 1.0 |
| Initial Set Time, hrs. | 8.5 | 5.0 |
| Physical Properties | | |
| After Drying at 230° F. | | |
| Modulus of Rupture, $lb/in^2$ | 600 | 600 |
| After Firing to 1500° F. | | |
| Bulk Density, $lb/ft^3$ | 147 | 145 |
| Apparent Porosity, % | 23.2 | 24.0 |
| Linear Change, % | –0.1 | –0.1 |
| Modulus of Ruture, $lb/in^2$ | 500 | 600 |
| Cold Crushing Strength, $lb/in^2$ | 3000 | 3200 |
| After Firing to 2700° F. | | |
| Bulk Density, $lb/ft^3$ | 137 | 138 |
| Apparent Porosity, % | 22.4 | 23.0 |
| Linear Change, % | 2.2 | 1.2 |
| Modulus of Rupture, $lb/in^2$ | 1700 | 1800 |
| After Firing to 2910° F. | | |
| Bulk Density, $lb/ft^3$ | 138 | 135 |
| Apparent Porosity, % | 18.7 | 18.0 |
| Linear Change, % | 2.2 | 1.6 |
| Modulus ofRupture, $lb/in^2$ | 2100 | 2600 |
| Hot Modulus of Rupture, $lb/in^2$ | | |
| @ 2000° F. | 900 | 600 |
| @ 2500° F. | 400 | 300 |

Examples 1 and 2 illustrate how an additive comprised of metakaolin/fume silica may be substituted for about 33.3% of a cement in an existing conventional castable, thereby lowering the cost of the castable, without significantly affecting the casting properties and physical properties thereof. In this respect, the working time and initial set times of refractory Mixes A and C are only slightly longer than Mixes B and D, respectively. However, the hot modulus of rupture @ 2000° F. and @ 2500° F. are higher for Mixes A and C as compared respectively to Mixes B and D. Mixes A and C in Examples 1 and 2 thus illustrate how a metakaolin/ fume silica system may be used to replace a portion of calcium aluminate cement in a refractory mix.

In Mixes A and C, an 80% $Al_2O_3$ calcium aluminate cement manufactured and sold by Alcoa Industrial Chemicals under the trade designation "CA-25C" is used. This 80% $Al_2O_3$ calcium aluminate cement contains an admixture package for controlling the work time and the set time. Mixes A and C thus show that a metakaolin/fume silica system in accordance with the present invention may be used advantageously with existing manufactured calcium aluminate cement packages that contain admixture additives.

In Mixes A and C, a plasticizer is also used to improve the casting behavior of the refractory castable. Numerous types of plasticizers may be used. But in the mixes illustrated, MX2026 Surfactant, sold by Borden and Remington, Inc. is used.

EXAMPLE 3

Metakaolin Used In a Conventional 50% $Al_2O_3$ Castable

| | Mix Identification | |
|---|---|---|
| Description | E<br>Conventional<br>Castable<br>w/Metakaolin | F<br>Comparative<br>Conventional<br>Castable |
| Service Limit, ° F. | 2550 | 2550 |
| Mix Formulation | | |
| Fireclay Aggregate (3.5/100M) | 52.5 | 52.5 |
| Fireclay Aggregate (−100M) | 7.5 | 7.5 |
| 60% $Al_2O_3$ CA-Cement | 20 | 30 |
| Metakaolin | 8 | |
| Fume Silica | 2 | |
| Darvan 811D | 0.15 | |
| Boric Acid | 0.03 | |
| Chemical Composition, wt. % | | |
| $Al_2O_3$ | 44.8 | 46.7 |
| $SiO_2$ | 43.9 | 38.1 |
| $Fe_2O_3$ | 0.6 | 0.7 |
| $TiO_2$ | 2.3 | 2.3 |
| MgO | 0.3 | 0.3 |
| CaO | 7.7 | 11.5 |
| $Na_2O/K_2O$ | 0.5 | 0.5 |
| Casting Properties | | |
| Wet Mixing Time, mins. | 7 | 5 |
| Water to Cast, % | 9.8 | 12.7 |
| Flow ASTM 860, % | 86 | 82 |
| Working Time, hrs. | 0.8 | 1.0 |
| Initial Set Time, hrs. | 10.5 | 5.0 |
| Physical Properties | | |
| After Drying at 230° F. | | |
| Bulk Density, $lb/ft^3$ | 140 | 136 |
| Apparent Porosity, % | 16.2 | 17.8 |
| Modulus of Rupture, $lb/in^2$ | 1800 | 1200 |
| Cold Crushing Strength, $lb/in^2$ | 8700 | 6700 |
| After Firing to 1500° F. | | |
| Bulk Density, $lb/ft^3$ | 132 | 126 |
| Apparent Porosity, % | 25.7 | 32.3 |
| Linear Change, % | −0.1 | −0.2 |
| Modulus of Rupture, $lb/in^2$ | 1300 | 700 |
| Cold Crushing Strength, $lb/in^2$ | 5900 | 3500 |
| After Firing to 2550° F. | | |
| Bulk Density, $lb/ft^3$ | 132 | 121 |
| Apparent Porosity, % | 22.6 | 30.4 |
| Linear Change, % | −0.1 | 1.6 |

-continued

| | Mix Identification | |
|---|---|---|
| Description | E<br>Conventional<br>Castable<br>w/Metakaolin | F<br>Comparative<br>Conventional<br>Castable |
| Modulus of Rupture, $lb/in^2$ | 2100 | 1700 |
| Cold Crushing Strength, $lb/in^2$ | 9300 | 4400 |
| Hot Modulus of Rupture, $lb/in^2$ | | |
| @ 2000° F. | 1700 | 800 |
| @ 2500° F. | 1500 | 600 |

Mix E of Example 3 shows a metakaolin/fume silica system replacing a more reactive calcium aluminate cement in 50% alumina castable mixes. The term "more reactive" as used herein, generally refers to a pure calcium aluminate cement without any admixture additives to affect the working time and the set time of the castable. In Mix E, a 60% $Al_2O_3$ calcium aluminate cement is used. The metakaolin/fume silica system added to the refractory mix required an organic dispersant to facilitate wet mixing of the refractory mix. DARVAN® 811D is used. Because the cement contains no admixture additives, boric acid is added to overcome the rapid set that the metakaolin/fume silica system has on a refractory mix and to provide longer working times.

While the initial set time of Mix E is longer than a comparable castable mix without the metakaolin/fume silica system (Mix F), the physical properties of Mix E are better than the comparable castable Mix F, at a reduced cost.

EXAMPLE 4

Metakaolin Used In a Conventional 50% $Al_2O_3$ Castable With Binary Set-Modifying Admixture

| | Mix Identification | |
|---|---|---|
| Description | G<br>Improved<br>Conventional<br>Castable<br>w/Metakaolin | H<br>Comparative<br>Conventional<br>Castable |
| Service Limit, ° F. | 2550 | 2550 |
| Mix Formulation | | |
| Fireclay Aggregate (3.5/100M) | 62.5 | 62.5 |
| Fireclay Aggregate (−100M) | 7.5 | 7.5 |
| 60% $Al_2O_3$ CA-Cement | 20 | 30 |
| Metakaolin | 8 | |
| Fume Silica | 2 | |
| Darvan 8llD | 0.15 | |
| Boric Acid | 0.05 | |
| Lithium Carbonate | 0.075 | |
| Chemical Composition, wt. % | | |
| $Al_2O_3$ | 45.7 | 47.8 |
| $SiO_2$ | 43.6 | 37.7 |
| $Fe_2O_3$ | 0.6 | 0.7 |
| $TiO_2$ | 2.4 | 2.5 |
| MgO | 0.3 | 0.3 |
| CaO | 7.0 | 10.5 |
| $Na_2O/K_2O$ | 0.5 | 0.5 |
| Casting Properties | | |
| Wet Mixing Time, mins. | 5 | 5 |
| Water to Cast, % | 9.9 | 12.7 |
| Flow ASTM 860, % | 64 | 82 |
| Working Time, hrs. | 1.5 | 1.0 |

-continued

| | Mix Identification | |
|---|---|---|
| | G<br>Improved<br>Conventional<br>Castable | H<br>Comparative<br>Conventional |
| Description | w/Metakaolin | Castable |
| Initial Set Time, hrs. | 4.5 | 5.0 |
| Physical Properties | | |
| After Drying at 230° F. | | |
| Modulus of Rupture, lb/in$^2$ | 1600 | 1200 |
| After Firing to 1500° F. | | |
| Bulk Density, lb/ft$^3$ | 133 | 126 |
| Apparent Porosity, % | 24.6 | 32.3 |
| Linear Change, % | −0.2 | −0.2 |
| Modulus of Rupture, lb/in$^2$ | 1100 | 700 |
| Cold Crushing Strength, lb/in$^2$ | 6800 | 3500 |
| Abrasion, cm$^3$ | 10.2 | 21.0 |
| After Firing to 2550° F. | | |
| Bulk Density, lb/ft$^3$ | 138 | 121 |
| Apparent Porosity, % | 19.0 | 30.4 |
| Linear Change, % | −1.4 | 1.5 |
| Modulus of Rupture, lb/in$^2$ | 2100 | 1700 |
| Hot Modulus of Rupture, lb/in$^2$ | | |
| @ 2000° F. | 1300 | 800 |
| @ 2500° F. | 400 | 600 |

EXAMPLE 5

Metakaolin Used In a Conventional 60% Al$_2$O$_3$ Castable With Binary Set-Modifying Admixture

| | Mix Identification | |
|---|---|---|
| | I<br>Improved<br>Conventional<br>Castable | J<br>Comparative<br>Conventional |
| Description | w/Metakaolin | Castable |
| Service Limit, ° F. | 3100 | 3100 |
| Mix Formulation | | |
| Fireclay Aggregate (3.5/65M) | 45 | 45 |
| Calcined Bauxite (8/65M) | 15 | 15 |
| Calcined Bauxite (−200M) | 10 | 10 |
| Kyanite Fines (−100M) | 15 | 15 |
| 70% Al$_2$O$_3$ CA-Cement | 10 | 15 |
| Metakaolin | 4 | |
| Fume Silica | 1 | |
| Darvan 811D | 0.15 | |
| Boric Acid | 0.025 | |
| Lithium Carbonate | 0.038 | |
| Chemical Composition, wt. % | | |
| Al$_2$O$_3$ | 58.9 | 60.8 |
| SiO$_2$ | 34.5 | 31.4 |
| Fe$_2$O$_3$ | 0.8 | 0.8 |
| TiO$_2$ | 2.2 | 2.1 |
| MgO | 0.2 | 0.2 |
| CaO | 2.8 | 4.1 |
| Na$_2$O/K$_2$O | 0.5 | 0.5 |
| Casting Properties | | |
| Wet Mixing Time, mins. | 5 | 5 |
| Water to Cast, % | 9.9 | 9.5 |
| Flow ASTM 860, % | 84 | 60 |
| Working Time, hrs. | 1.5 | 1.0 |
| Initial Set Time, hrs. | 6.5 | 5.0 |
| Physical Properties | | |

-continued

| | Mix Identification | |
|---|---|---|
| | I<br>Improved<br>Conventional<br>Castable | J<br>Comparative<br>Conventional |
| Description | w/Metakaolin | Castable |
| After Drying at 230° F. | | |
| Modulus of Rupture, lb/in$^2$ | 1500 | 600 |
| After Firing to 1500° F. | | |
| Bulk Density, lb/ft$^3$ | 141 | 145 |
| Apparent Porosity, % | 26.6 | 24.0 |
| Linear Change, % | −0.1 | −0.1 |
| Modulus of Rupture, lb/in$^2$ | 600 | 600 |
| Cold Crushing Strength, lb/in$^2$ | 3200 | 3200 |
| After Firing to 2700° F. | | |
| Bulk Density, lb/ft$^3$ | 136 | 138 |
| Apparent Porosity, % | 23.9 | 23.0 |
| Linear Change, % | 1.5 | 1.2 |
| Modulus of Rupture, lb/in$^2$ | 2500 | 1800 |
| After Firing to 2910° F. | | |
| Bulk Density, lb/ft$^3$ | 138 | 135 |
| Apparent Porosity, % | 18.7 | 18.0 |
| Linear Change, % | 2.2 | 1.6 |
| Modulus of Rupture, lb/in$^2$ | 2100 | 2600 |
| Hot Modulus of Rupture, lb/in$^2$ | | |
| @ 2000° F. | 900 | 600 |
| @ 2500° F. | 400 | 300 |

Mix G of Example 4 shows the use of a metakaolin/fume silica system in a 50% alumina castable. The metakaolin/fume silica system is substituted for about 33.3% of a pure 60% Al$_2$O$_3$ calcium aluminate cement. In Mix I, a metakaolin/fume silica system is used in a 60% alumina castable, and the metakaolin/fume silica system replaces about 33.3% of a pure 70% Al$_2$O$_3$ calcium aluminate cement.

In both Mixes G and I, a binary set-modifying admixture is used to modify the working times and set times of the refractory mixes. In Mixes G and I, the binary set-modifying admixture is comprised of boric acid and lithium carbonate. For both Mixes G and I, the use of the binary set-modifying admixture reduces the set time of the mixes as compared to Mix E. Mixes G and I include lithium carbonate that, it is believed, produces set times and working times that are acceptable compared to like refractory mixes without the metakaolin/fume silica system (i.e., Mixes H and J, respectively). However, the physical properties of Mixes G and I show an improvement over comparable castable mixes without the metakaolin/fume silica system (i.e., Mixes H and J, respectively). In this respect, Mix G shows a refractory mix having improved properties after firing to 1500° F., that would find advantageous application in many industrial applications requiring a low cost pumpable refractory concrete having high strength and abrasion resistance.

The foregoing Examples 1 through 5 illustrate how powdered amorphous metakaolin may be used to replace a portion of the calcium aluminate cement found in refractory mixes. The use of a powdered amorphous metakaolin as part of a refractory system allows for reduced calcium aluminate cement, and in most instances, the use of less water in the refractory mix. Depending upon the refractory mix and the calcium aluminate cement used, a dispersant system and a binary set-modifying admixture may be required to modify the rheology and flow characteristics of the refractory mix. The foregoing Examples show that the use of powdered amorphous metakaolin, together with a dispersant system and a binary set-modifying admixture, can substantially increase the physical properties of a refractory mix, while at the same time, reducing the overall cost by eliminating costly calcium aluminate cement. As indicated above, a powdered amorphous metakaolin system containing fume silica finds advantageous application with cement systems containing admixture additives as well as pure cements when used in conjunction with plasticizers and/or set accelerants and set retarders.

In addition to the foregoing advantages and benefits, it has been found that the use of powdered amorphous metakaolin in refractory mixes produces a wet refractory mix having flow characteristics and properties which lend themselves to wet-process shotcreting. In this respect, although less water is generally required with the addition of powdered amorphous metakaolin, the wetted refractory mix typically has an improved flow characteristic. In this respect, it is believed that the fine metakaolin particles, together with the fine fume silica, enhance the flow characteristics of a refractory mix.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. An additive for reducing the calcium aluminate cement content in a refractory mix containing calcium aluminate cement, said additive comprised of:
   about 75% to about 83% by weight of an amorphous metakaolin powder having a mean particle size of about 3.0 microns, said amorphous metakaolin powder having an x-ray diffraction pattern having amorphous humps at 2 θ equals approximately 22°, 37° and 46°;
   about 17% to about 25% by weight of an inorganic fine filler material selected from the group consisting of microsilica, fly ash and reactive alumina, said fine filler material having a particle size of less than 45 microns;
   less than 0.5% by weight of a water soluble, organic dispersant; and
   less than 0.3% by weight of a binary set-modifying admixture.

2. An additive as defined in claim 1, wherein said fine filler material is microsilica.

3. An additive as defined in claim 1, wherein said set-modifying admixture is a binary admixture comprised of less than 0.2% by weight of a set accelerator and less than 0.1% by weight of an acid set retarder.

4. An additive as defined in claim 3, wherein said set accelerator is lithium carbonate.

5. An additive as defined in claim 3, wherein said set retarder is selected from the group consisting of boric acid, citric acid and tartaric acid.

6. An additive as defined in claim 5, wherein said set retarder is boric acid.

7. An additive for use in a refractory mix, comprised of:
   about 75% to about 83% by weight of amorphous metakaolin powder having a particle size of less than about 45 microns, said amorphous metakaolin powder having an x-ray diffraction pattern having amorphous humps at 2θ equals approximately 22°, 37° and 46°; and
   about 17% to about 25% by weight of an inorganic, fine filler material selected from the group consisting of microsilica, fly ash and reactive alumina, said fine filler material having a particle size of less than about 45 microns.

8. An additive as defined in claim 7, wherein about 90% of said metakaolin powder has a particle size of about 15 microns or less, and said inorganic fine filler is microsilica.

9. A cement mixture for refractory mixes, comprised of:
   about 50% to about 75% by weight of calcium aluminate cement;
   about 20% to about 40% by weight amorphous metakaolin powder having a mean particle size of less than about 3 microns, said amorphous metakaolin powder having an x-ray diffraction pattern having amorphous humps located by conventional x-ray diffraction procedures at 2θ equals approximately 22°, 37° and 46° and having an average particle size smaller than the average particle size of said calcium aluminate cement; and
   about 5% to about 10% by weight microsilica having a mean particle size of less than 45 microns.

10. A cement mixture as defined in claim 9, comprised of:
    about 67% by weight of calcium aluminate cement;
    about 26% by weight amorphous metakaolin powder;
    about 7% by weight microsilica;
    less than about 0.5% by weight organic dispersant;
    less than about 0.1% by weight of a set accelerator; and
    less than about 0.1% by weight of an acidic set retarder.

11. A cement mixture as defined in claim 10, wherein said dispersant is a polyacrylate polymer in granular form.

12. A cement mixture as defined in claim 10, wherein said set retarder is selected from the group consisting of boric acid, citric acid and tartaric acid.

13. A cement mixture as defined in claim 12, wherein said set retarder is boric acid.

14. A cement mixture as defined in claim 10, wherein said set accelerator is lithium carbonate.

15. A cement mixture for a refractory mix, comprised of:
    calcium aluminate cement;
    a metakaolin containing additive in an amount equal to about 40% to about 60% by weight of said calcium aluminate cement, said metakaolin containing additive comprised of about 70% to about 85% by weight of an amorphous metakaolin powder and about 17% to about 25% by weight of a fine filler material selected from the group consisting of microsilica, reactive alumina and fly ash, said amorphous metakaolin powder having an x-ray diffraction pattern having amorphous humps located by conventional x-ray diffraction procedures at 2θ equals approximately 22°, 37° and 46° and having an average particle size smaller than the average particle size of said calcium aluminate cement; and
    less than about 0.5% by weight of a water soluble organic dispersant; and
    less than about 0.2% by weight of a set accelerator.

16. A mixture as defined in claim 15, wherein about 99% of said amorphous metakaolin powder has a particle size of 45 microns or less.

17. A mixture as defined in claim 15, wherein about 90% of said amorphous metakaolin powder has a particle size of 15 microns or less.

18. A mixture as defined in claim 15, wherein about 50% of said amorphous metakaolin powder has a particle size of 5 microns or less.

19. A mixture as defined in claim 15, wherein said fine filler is microsilica having a particle size of about 45 microns or less.

20. A mixture as defined in claim 15, wherein said organic dispersant is a polyacrylate polymer.

21. A mixture as defined in claim 15, further comprising a set-modifying admixture to modify the set time and working time of a refractory castable.

22. A cement mixture for use with a refractory castable, comprised of:
   a pure calcium aluminate cement having an alumina content of about 45% to about 80% by weight;
   an additive comprised of about 70% to about 85% by weight of amorphous metakaolin powder, wherein about 99% of said metakaolin powder has a particle size of about 45 microns or less, and about 15% to about 30% by weight of microsilica, wherein about 99% by weight of said microsilica has a particle size of about 45 microns or less, said additive present in an amount equal to about 40% to about 60% by weight of said calcium aluminate cement.

23. A mixture as defined in claim 22, further comprising a set retarder and a set accelerant.

24. A mixture as defined in claim 22, further comprising a water soluble organic dispersant.

25. A refractory castable mix, comprised of:
   refractory aggregate and particulate;
   about 10% to about 30% by weight calcium aluminate cement;
   a reactive additive comprised of about 4 parts by weight of amorphous metakaolin powder and about 1 part by weight microsilica, said amorphous metakaolin powder having an x-ray diffraction pattern having amorphous humps at 2θ equals approximately 22°, 37° and 46° and having an average particle size smaller than the average particle size of said calcium aluminate cement, said additive present in an amount equal to about 50% by weight of said calcium aluminate cement;
   a dispersant; and
   a set-modifying admixture comprised of a set retarder selected from the group consisting of boric acid, citric acid and tartaric acid, and a set accelerator comprised of lithium carbonate.

26. A mix as defined in claim 25, wherein said set retarder is boric acid.

27. A mix as defined in claim 25, wherein about 99% of said metakaolin and said microsilica have a particle size of about 45 microns or less.

28. A refractory castable mix, comprised of:
   about 60% to about 80% by weight refractory aggregate and particulate;
   about 10% to about 30% by weight calcium aluminate cement;
   about 4% to about 18% by weight amorphous metakaolin powder, said amorphous metakaolin powder having an x-ray diffraction pattern having amorphous humps located at 2θ equals approximately 22°, 37° and 46°, and about 99% of said metakaolin powder having a particle size of less than about 45 microns;
   about 1% to about 5% by weight fine filler material selected from the group consisting of microsilica, reactive alumina and fly ash; about 99% of said filler material having an average particle size of less than about 45 microns;
   a set retarder selected from the group consisting of boric acid, citric acid and tartaric acid; and
   a set accelerator comprised of lithium carbonate.

29. A mix as defined in claim 28, further comprising an organic dispersant.

30. A mix as defined in claim 28, wherein said set retarder is boric acid.

31. A mix as defined in claim 28, wherein said filler material is microsilica.

32. A mix as defined in claim 28, wherein said amorphous metakaolin and said fine filler material together are present in an amount equal to about 45% to about 55% by weight of said calcium aluminate cement.

33. A mix as defined in claim 29, wherein said organic dispersant is a water soluble polyacrylate polymer in granular form.

* * * * *